United States Patent [19]
Whittington et al.

[11] Patent Number: 5,359,526
[45] Date of Patent: Oct. 25, 1994

[54] TERRAIN AND CULTURE GENERATION SYSTEM AND METHOD

[75] Inventors: Reed C. Whittington; Joe Nguyen; Judith G. Pafford, all of Arlington, Tex.

[73] Assignee: Hughes Training, Inc., Arlington, Tex.

[21] Appl. No.: 13,461

[22] Filed: Feb. 4, 1993

[51] Int. Cl.$^5$ .................. G06F 12/00; G06F 15/20
[52] U.S. Cl. .................. 364/443; 364/456; 342/64; 340/990; 340/995
[58] Field of Search .................. 364/443, 449, 456; 340/990, 995; 342/64

[56] References Cited

U.S. PATENT DOCUMENTS

| | | | |
|---|---|---|---|
| 4,685,068 | 8/1987 | Greco, II et al. | 364/518 |
| 4,737,916 | 4/1988 | Ogawa et al. | 364/443 |
| 4,766,555 | 8/1988 | Bennett | 364/518 |
| 4,823,271 | 4/1989 | Clark et al. | 364/443 |
| 4,825,381 | 4/1989 | Bottorf et al. | 364/443 |
| 5,249,265 | 9/1993 | Liang | 395/160 |

FOREIGN PATENT DOCUMENTS

| | | |
|---|---|---|
| 436263A | 7/1991 | European Pat. Off. . |
| 525792A | 2/1993 | European Pat. Off. . |
| 9006561 | 6/1990 | PCT Int'l Appl. . |
| 9014627 | 11/1990 | PCT Int'l Appl. . |

OTHER PUBLICATIONS

PCT International Search Report, PD-C92005, PCT #94/01178 17 Sep. 1990.
"Integrating GIS;s and REmote Sensing Image Analysis Systems by Unifying Knowledge Representation Schemes" IEEE Transactions on Geoscience and Sensing, 29 Jul. 1991, No. 4, vol. 29.

Primary Examiner—Thomas G. Black
Assistant Examiner—Julie D. Day
Attorney, Agent, or Firm—W. K. Denson-Low

[57] ABSTRACT

A method and system (10) for generating a reconfigurable terrain and culture database of a simulated environment. Terrain and culture data are extracted from at least one of a plurality of digital data sources (14), and the extracted data is transformed into a predetermined central database format (22) from which the extracted data may be edited (24) and formatted (28) for a particular imaging system. The terrain and culture data are not merged until formatting in order to enable rapid reskinning of the terrain or the addition of further culture detail.

4 Claims, 2 Drawing Sheets

TERRAIN AND CULTURE GENERATION SYSTEM AND METHOD

BACKGROUND OF THE INVENTION

1. Field of the Invention

The present invention relates generally to training and mission simulation systems, and particularly to a method and system for generating a reconfigurable terrain and culture data base of a simulated environment.

2. Description of Related Art

Flight simulation has proved to be an effective method for crew and mission training. An integral component of flight simulation is the out-of-the-window visual scene. The creation of such a visual database typically begins with real-world source data that has been derived from satellite imagery, U.S. Geological Survey information or a mapping agency. However, in order to comply with visual system requirements, changes to this data is generally made during database production. In this regard, it should be appreciated that the training crew needs to be presented with as many different situations as possible, and these situations may be introduced through a non-real-world or customized visual database which is tailor made for the desired training exercise or through a close approximate to the real-world. Accordingly, it is often necessary to add features to the visual database that do not appear in the real-world area being simulated or modify existing features.

While a specific simulation system may be very effective for a particular training application, it should also be appreciated that there are many diverse situations where a simulation system would be desirable. However, if the simulation system has to be redesigned for each new project or set of training exercises, then substantial costs will result and valuable time will be lost. Nevertheless, in order to maximize the training benefit, an accurate representation of a particular visual database is necessary. Accordingly, there is a need for a technique for producing visual databases that not only provide an exact depiction of the input data, but a technique which will also enable the simulation system to be configured for a variety of training applications.

SUMMARY OF THE INVENTION

The present invention provides a method and system for generating a terrain and cultural data base for a simulated visual environment. The method includes the steps of reading input data from at least one of a plurality of digital data sources, and translating or transforming this input data into a central database structure. The standardized central database may subsequently be edited and formatted for a particular file or display output. The transformation process will automatically generate a terrain skin and place point, lineal and area features upon it. In this regard, a feature library may be utilized to populate the terrain skin with generally used objects, such as radio towers and factories. The terrain is preferably made into polygons with either a modified Delauney triangulation or right triangles for a best fit within the resolution and accuracy requirements.

One of the advantages of the invention is that the terrain elevation and culture data are not merged until formatting, in order to allow for the reskinning of the terrain or the digitizing of additional culture detail. This procedure facilitates an increase in the database content and complexity without having to start over in the database production cycle. This procedure also enhances the capability to prototype the database design. Thus, for example, the ability to reskin a section of terrain in a database without losing digitized culture and features allows a high-detailed terrain resolution insert to be generated in a matter of a few minutes. The boundaries of the section are forced to match with the terrain boundaries surrounding it. At the same time, the configuration data files that determine the filtering of the cultural and feature information can also be modified to reflect an increased object density and feature placement accuracy.

Additional features and advantage of the present invention will be made more apparent from a reading of the description of the preferred embodiment which makes reference to the following drawings.

DESCRIPTION OF THE PREFERRED EMBODIMENTS

Figure 1:
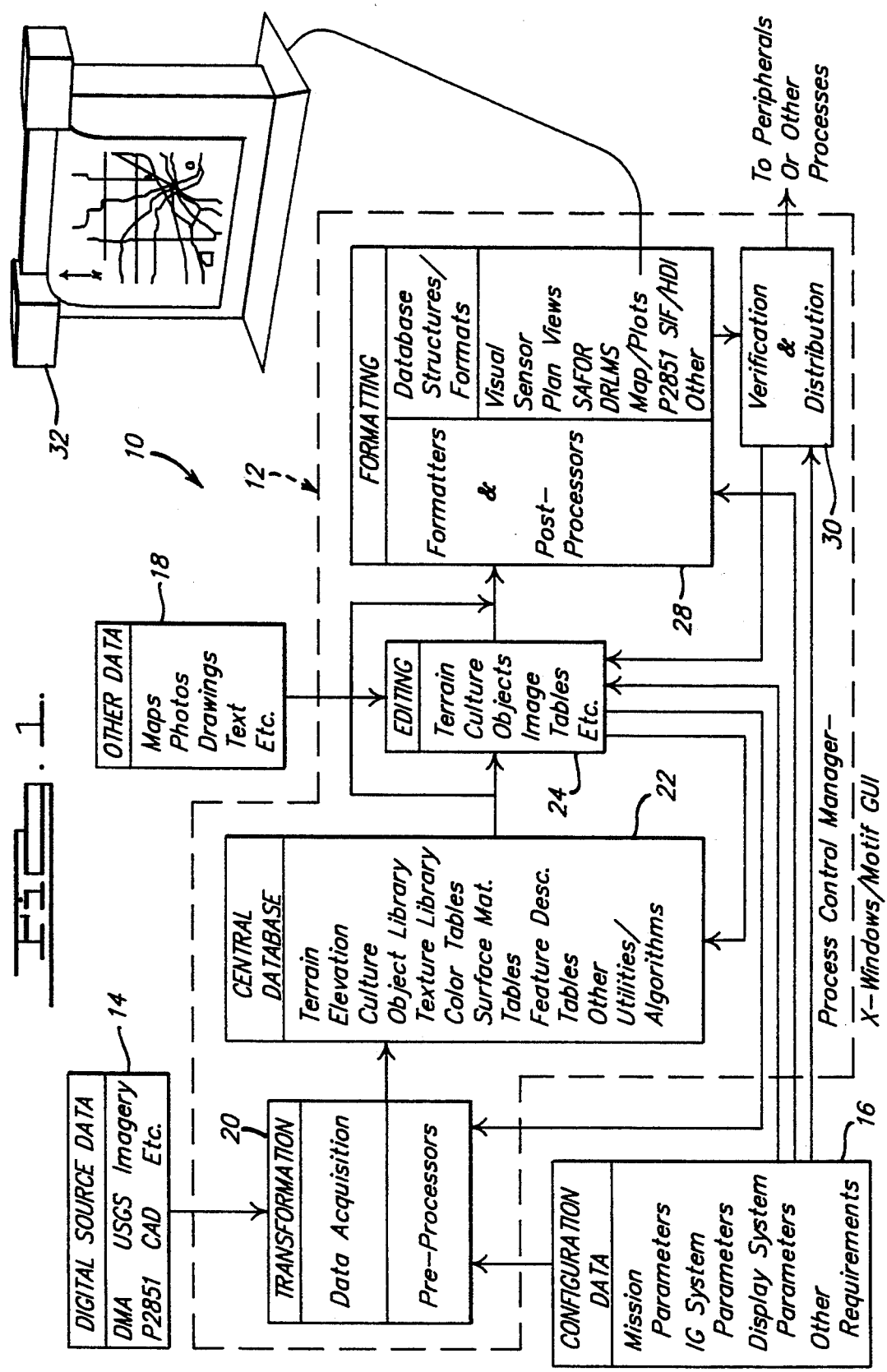
FIG. 1 provides a diagrammatic view of a terrain and culture database generation system in accordance with the present invention.

Referring now to the drawings in more detail, FIG. 1 diagrammatically illustrates the terrain and culture database generation system 10 according to the present invention. FIG. 1 includes a large broken-line block 12 which represents the computer workstation that contains the processing software that may be used to create a three-dimensional visual database of a simulated world. In one embodiment according to the present invention, the computer workstation 12 is a Silicon Graphics workstation which utilizes a UNIX operating system and the X-Windows/MOTIF graphical user interface. However, it should be appreciated that other suitable computer systems may be used in the appropriate application.

FIG. 1 also illustrates three external blocks 14–18, which represent various sources of input data. For example, block 14 represents the basic source data from which a visual database of a geographic area may be generated. This basic source data may be received in a number of different areal or cartographic formats, such as data which has been made available from the Defense Mapping Agency ("DMA"), from U.S. Geological Survey ("USGS") information, Project 2851 SIF/HDI or GTDB information, or from satellite imagery. In contrast, block 16 represents configuration data which contains a set of requirements of the project in question. For example, this configuration data may identify which cultural features should be shown or hidden. Additionally, the configuration data may identify a specific geographic area to be processed, or whether the imaging system of a flight simulator should be set for low level flying.

As shown by block 20, the source data 14 is transformed into an intermediate database file format which will facilitate a subsequent editing process. Similarly, the configuration data 16 will be preprocessed with the source data 14 in order to create the central database 22. The central database 22 will generally include terrain data, elevation data, cultural data, an object library (e.g., icons for radio towers, bridges and dams), a texture library (e.g., a swamp v. a lake), color tables (e.g., blue for water and gray for roads), surface material tables (e.g., asphalt, wood or soil), feature description tables (e.g., the size and orientation of a warehouse), and other utilities or algorithms appropriate to the visual database (e.g., polygonizing assumptions).

Then, as illustrated by external data block 18 and internal editing block 24, various aspects of the central database 22 may be edited or updated. For example, recent photographs of the subject area may be used to change the cultural data contained in the central database. In any event, it should be understood that the editing process may be used as part of the process of creating a simulated world from real world source data 14. In this regard, arrow 26 also indicates that the configuration data 16 may be utilized at this point to create the simulated world which is desired for a particular training exercise. In one form of the present invention, this editing process is performed graphically by adding or deleting features which are displayed on a computer monitor. As a result of this editing process, one or more central database area block files will be produced to represent the simulated world.

After the central database has been created for the simulated world of interest, then one or more formatting processes will be performed. In this regard, it should be appreciated that each imaging system will have its own native format. In other words, the file needed by the imaging system of a flight simulator will be different than the file needed to create a hard-copy map or chart of the visual database. Accordingly, different post-processing steps will be needed for each imaging system employed. Thus, for example the P2851 identifier in block 28 refers to a Standard Simulator Database Interchange Format (SIF). Similarly, the SAFOR identifier refers to a semi-automated forces format, and the DRLMS identifier refers to a digital radar land mass system format. Additionally, a plot file may be generated to ultimately produce a database correlatable chart. It should also be noted that block 30 is used to indicate that appropriate verification steps may be taken before the resulting image file are distributed.

In the case of chart generation, a Calcomp 5835XP plotter 32 may be used to ultimately generate the database correlatable chart. This particular plotter utilizes a sophisticated plotting language which is close to a graphical language. However, it should be appreciated that other suitable plotters or even printers could be used in the appropriate application. A further description of the charting capabilities may be found in the commonly assigned U.S. patent application Ser. No. 07/941,466, entitled "Database Correlatable Chart Generation System And Method", by Sherry Nathman and Reed Whittington, filed on Sep. 8, 1992. This patent application is hereby incorporated by reference.

A visual database could well cover several hundred miles. Accordingly, it should be appreciated that the central database should generally be built in area blocks of a specific size. As an example, the database configuration could use 16000×16000 meter area blocks, 500 meter elevation post spacing and 10 meter elevation intervals. In this regard, one central database area block file will contain the data which defines all of the terrain and cultural features in a $16K^2$ area. There are generally three types of cultural features contained in the central database, namely areal features (e.g., towns and lakes), lineal features (e.g., highways and railroad tracks) and point features (e.g., radio towers and buildings). It should be appreciated that the areal features may take any appropriate polygonal or close area shape, the lineal features may take any appropriate linear or non-linear course, and a point feature reference may take an appropriate icon shape for plan view display. It should also be noted that the icon shape may be built from one or more graphic primitives.

Additionally, it may also be appropriate to filter or group cultural point features together, so that they are redefined into areal features. For example, a cluster of individual buildings may be grouped into a city or residential areal feature which can be represented by a texture map or less complex textured object. Areal and lineal features should also be split along polygonal terrain boundaries and mapped to the terrain. Furthermore, as will be apparent from the discussion below, the terrain elevation and culture data are not merged until formatting, in order to allow for the reskinning of the terrain or the digitizing of additional culture detail. This procedure facilitates an increase in the database content and complexity without having to start over in the database production cycle.

Figure 2:
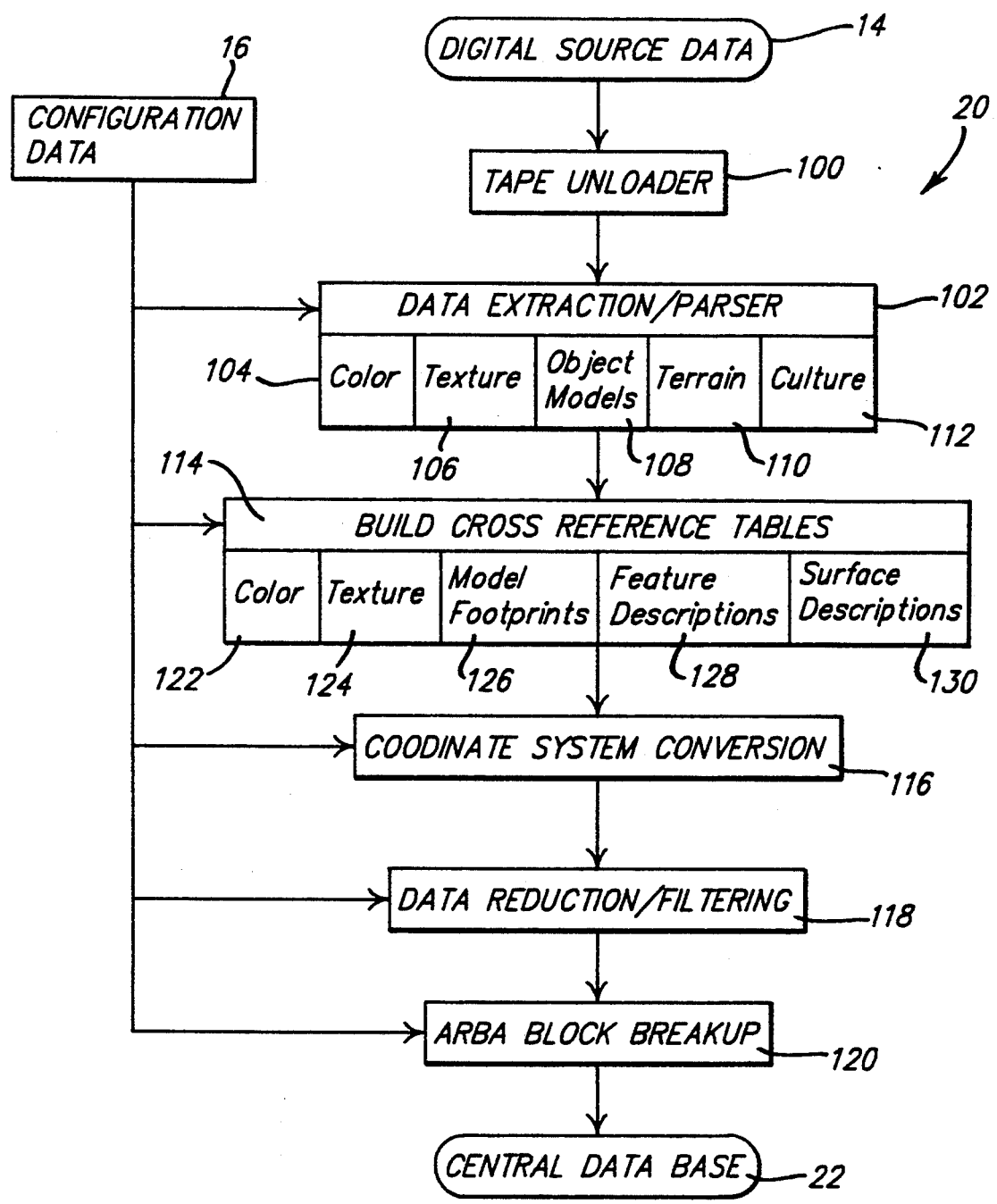
FIG. 2 is a flow chart of the data transformation method shown in FIG. 1.

Referring to FIG. 2, a flow chart of the transformation block 20 is shown. In this regard, the function of this modular software block is to input digital source data and convert it into a standardized central database structure. A tape unloader utility 100 is provided to support the extraction of data from those data sources 14 which have their information stored on magnetic tape. The digital data is then processed through a data extraction module 102, which provides a parser to read each source of data supported by the system 10. As illustrated in FIG. 2, the data extraction module 102 obtains distinct data types from the source data 14. More specifically, a color transformation block 104 is used to accept color tables in the format of the source data, and convert these color tables into the format employed by the database editor 24. Similarly, a texture transformation block 106 is provided to accept texture information, and convert this information to the format employed by the database editor 24. Additionally, an object modeler block 108 is provided to accept and convert both 2D and 3D models, a terrain transformation block 110 is provided to accept and convert terrain data, and a culture transformation block 112 is provided to accept and convert culture data.

Next, the cross reference module 114 will be employed to build cross reference tables for the appropriate feature types. In this regard, it may be necessary to automatically change one feature type to another depending upon the resolution to be displayed. Thus, for example, if a long building is defined as a lineal feature, it may ultimately need to be changed to a point feature with an appropriate width, length, height and orientation. Accordingly, the cross reference module 114 will enable feature descriptors and surface descriptors to be maintained in the central database editor 24 to augment the basic object model geometry. It may also be desirable to permit a point feature received from the data source 14 to be replaced with a generic point feature from a feature model library.

A coordinate system conversion module 116 is provided to convert terrain and culture data to/from various coordinate systems (i.e. Geodetic to Cartesian). Additional information about the models may also be stored as extensions. In one embodiment according to the present invention, the format used at this point is the FLT model format from Multigen by Software Systems. The basic geometry may be stored in this format with extensions available for those attributes not supported by the FLT format. For example, these additional attributes may include configuration management attributes (e.g., change control, author, status and version), FIC, SMC, footprint, and polygon attributes (e.g., surface descriptors).

Then, a data reduction and filtering module 118 may be used to provide automated feature reduction functions. In this regard, the filter will preferably employ polygon/line reduction techniques. These reduction techniques will specify the minimum height/width/area, the curvature angle between points, and the distance between points.

Finally, an area block breakup module 120 is provided to partition the gaming or simulation area into area blocks. In one embodiment herein, the area blocks will be comprised of square piece of the gaming area. However, the size and location of the area block partitioning may be user definable. Automatic border matching function may also be provided to prevent discontinuities between adjacent area blocks. Ultimately, terrain and culture data will be stored in a file associated with each area block, which are part of the central database 22.

With respect to the central database format itself, the blocks 122–130 indicate that the format employed will depend upon the data type involved. For example, the color tables may utilize an existing color format, such as SGI, FLT or PostScript. Similarly, the texture tables may utilize an existing texture/image/raster format, such as SGI Image, Sun Raster or ADRG. While the object models 126 may employ an existing format (e.g., FLT or IGE-ISF), additional attributes may also need to be maintained. Feature descriptors will preferably be referenced by each feature. Specifically, different feature descriptors should be provided for each type (e.g., lineal, point and areal) and each kind (e.g., FIC). The feature descriptors should contain information on each feature, such as the feature name, the feature type, the feature category, and the feature description. Likewise, surface descriptors will be referenced by each surface (i.e., polygon) in the database. In this regard, some surface descriptors may be more complex than others. Some surface descriptors may have texture, reflectivity and color, while others may have color and texture or just color. Point feature foot print information may be obtained from two sources, such as a complex Footprint obtained from the extreme points of a model or the height, width, length, orientation (HWLO) of the point feature reference.

The following sets forth a description of the area block file format employed by the culture data editor 24.

File organization:
    <header_record>←must be the first record
    <terrain_grid_record>←optional record/defaults to sea level
    <feature_record(s)>←feature records can be in any order and are optional Notes:
Records are separated by a semicolon. Each record has a record label of the for <record_label>: Each field has a filed id followed by the field value, fields are separated by a comma. Field can be in any order within a record. Comments are any line that starts with a # in column 1.

If COORD_SYS is GEODETIC then coordinate pairs are in 1/1000 of a sec. and are ordered <lon lat> so that they will correspond to <x y> when the COORD_SYS is CARTESIAN. If COORD_SYS is CARTESIAN the coordinate pairs are in meters.

```
Sample Data:
HEADER:
FILE N3500W12300N3600W12100,
CAT_ID XXXXXX,
COORD_SYS GEODETIC,
# Z_UNIT can be METERS or FEET
Z_UNIT      METERS,
SW_LL 35.000000 −123.000000,
NE_LL 36.000000 −121.000000,
SE_LL 35.000000 −121.000000,
NW_LL 36.000000 −123.000000,
# when in GEODETIC the xy corners are in 1/1000 of an
# arc sec. and order <lon lat> otherwise in meters
SW_XY −442800000.000000 126000000.000000,
NE_XY −435600000.000000 129600000.000000,
SE_XY −435600000.000000 126000000.000000,
NW_XY −442800000.000000 129600000.000000,
;
############ TERRAIN GRID
# NS_SPACE and EW_SPACE define the distance between
# elevation points.
# if GEODETIC then this is in 1/1000 sec. if CARTESIAN
# then in meters.
# NS means the distance between points in the North
# South direction.
# EW means the distance between points in the East
# West direction.
# The TGRID is ordered like so:

#    S
# W + E
#    N

# So row 0 is the south most row and the [0] [0] value
# is at the SW corner.

# ← row 0 →
```

```
# ← row 1 →
# ← row 2 →

# A row looks like so:
# <col 0, col 1, col 2, ... >

# Elevation (Z) values are in METERS or FEET with 1sb.
# of 1.
TGRID: NUM_ROWS 3, NUM_COLS 5, NS_SPACE 1800000,
EW_SPACE 1800000,
0 1 1 0 1
31 1 0 11 1
32 2 0 11 2
;
############ AREAL FEATURES
# Note: All feature attribute information that defines
# a distance is in meters. This is true for GEODETIC
# or CARTESIAN
AFEAT: MAPPED_NAME PFD ******, FDC A1001, FAC 1, FIC 902,
SMC O, IMPORTANCE 10, HEIGHT 10, NSTRUCT 1, TREE 0,
ROOF 0, NUM_VTX 4
0.000000 0.000000
0.000000 600000.000000
600000.000000 600000.000000
600000.000000 0.000000
;
############ LINEAL FEATURES
LFEAT: MAPPED_NAME ***BUSCH1, FDC A1001, FAC 1431,
FIC 621, SMC 2, IMPORTANCE 10, HEIGHT 6, WIDTH 3,
DIR 3, NUM_VTX 6
42688.000000 500192.000000
45312.000000 499392.000000
47904.000000 497904.000000
48896.000000 497104.000000
49600.000000 496800.000000
49600.000000 495808.000000
;
############ POINT FEATURES
PFEAT: MAPPED_NAME ***FMFM2, FDC A1001, FAC 269150464,
FIC 430, SMC 3, IMPORTANCE 10, HEIGHT 8, WIDTH 4,
LENGTH 4, ORIENT 361, NUM_VTX 1
90816.000000 483392.000000 0.0
;
```

From the above, it should be appreciated that the transformation block 20 will enable the automatic generation of a terrain skin, and the placement of point, lineal and areal features upon it using a rule-based system. Both regular and irregular triangulation techniques may be employed to generate the terrain skin. For example, for the irregular triangulation technique may use the automatic selection of control points from an elevation grid based on user defined parameters to derive the terrain skin. A feature library in the central database 121 may also be used to populate the terrain skin with generally used objects, such as radio towers and factories. Feature placement on the terrain is not constrained except for minor adjustments, which still maintain feature location (e.g., a road segment that crosses the intersection of six terrain facets may be moved slightly to avoid the proliferation of polygons). Other automated processes may be used to create terrain levels of detain and apply terrain levels of detail and apply terrain relaxation methods to conserve processed and displayed polygons.

In one form of the present invention, the central database structure is the quad-tree. Accordingly, if the centroid of a feature falls exactly on a subdivision in the quad-tree database, the database generation system 10 will move the feature reference point the shortest distance possible to place it into a subdivision. The bounding volume of the entire feature does not have to be moved into the quad-tree subdivision, just the reference point. Therefore, the variance in point feature placement relative to its position in the digital feature database is very small. Two-dimensional cultural features are segmented across quad-tree boundaries without losing the position of the feature and its general shape and appearance.

Another type of adjustment that may be performed by the database generation system 10 is to move a feature such as a road segment so that it does not cross an intersection of several terrain facets. This is done to avoid the proliferation of polygons. If the elevation point can be moved within the accuracy constraints placed upon it by the training requirements specification, that point may be moved slightly off the road. However, any feature adjustment is preferably done with a pre-defined set of rules which will limit the distance that feature reference points may be moved.

With respect to the central database editor 24, a graphical editor and a texture editor are preferably employed to allow the user to create or modify objects and decorate them with either photographic or synthetic texture. Thus, it should be appreciated that the database generation system provides an editable central database, which stores the hierarchical database structure and all the database descriptors to the levels required by each output format. In one embodiment herein, the Texture Map Editor (TME) by Rediffusion Simulation Limited is employed in the central database editor 24.

While the above detailed description sets forth the preferred embodiments of the present invention, it will be understood that the present invention is susceptible to modification, variation and change without departing from the scope and fair meaning of the subjoined claims.

What is claimed is:

1. A method for generating a reconfigurable terrain and culture database of a simulated environment, comprising the steps of:

providing a parser for each digital data source to be read;

extracting terrain and culture data from at least one of a plurality of digital data sources using the parser for said data source;

transforming the extracted data into a predetermined central database format from which the extracted data may be edited, regardless of the particular digital data source used to receive terrain and culture data;

wherein said transformation step includes the steps of:

building cross-reference tables for surface descriptions, feature descriptions and model footprints from said extracted data;

converting the geometry of said extracted data to a standard coordinate system to facilitate data base editing; and partitioning a geographic area defined by said extracted data into area blocks of a predetermined size and storing all of the data associated with each of said area blocks into a file associated with said area blocks.

2. The method according to claim 1, further including the step of editing said central database, and formatting said edited central database for one of a plurality of imaging systems.

3. The method according to claim 2, wherein terrain elevation and culture data are not merged until formatting to enable a reskinning of the terrain.

4. A reconfigurable terrain and culture database generation system, comprising:

means for extracting terrain and culture data of a simulated environment from at least one of a plurality of digital data sources;

means for transforming the extracted terrain and culture data into a predetermined central database format which provides separate database structures for storing said terrain data and said culture data, as well as object models and texture;

means for editing the terrain and culture data stored in said central database format; and means for formatting the terrain and culture data in said edited central database for one of a plurality of imaging systems, said terrain and culture data being merged by said formatting means to enable reskinning of the terrain.

* * * * *